May 31, 1932.  J. H. MANSFIELD  1,861,350
TAPPING MACHINE
Filed July 9, 1928
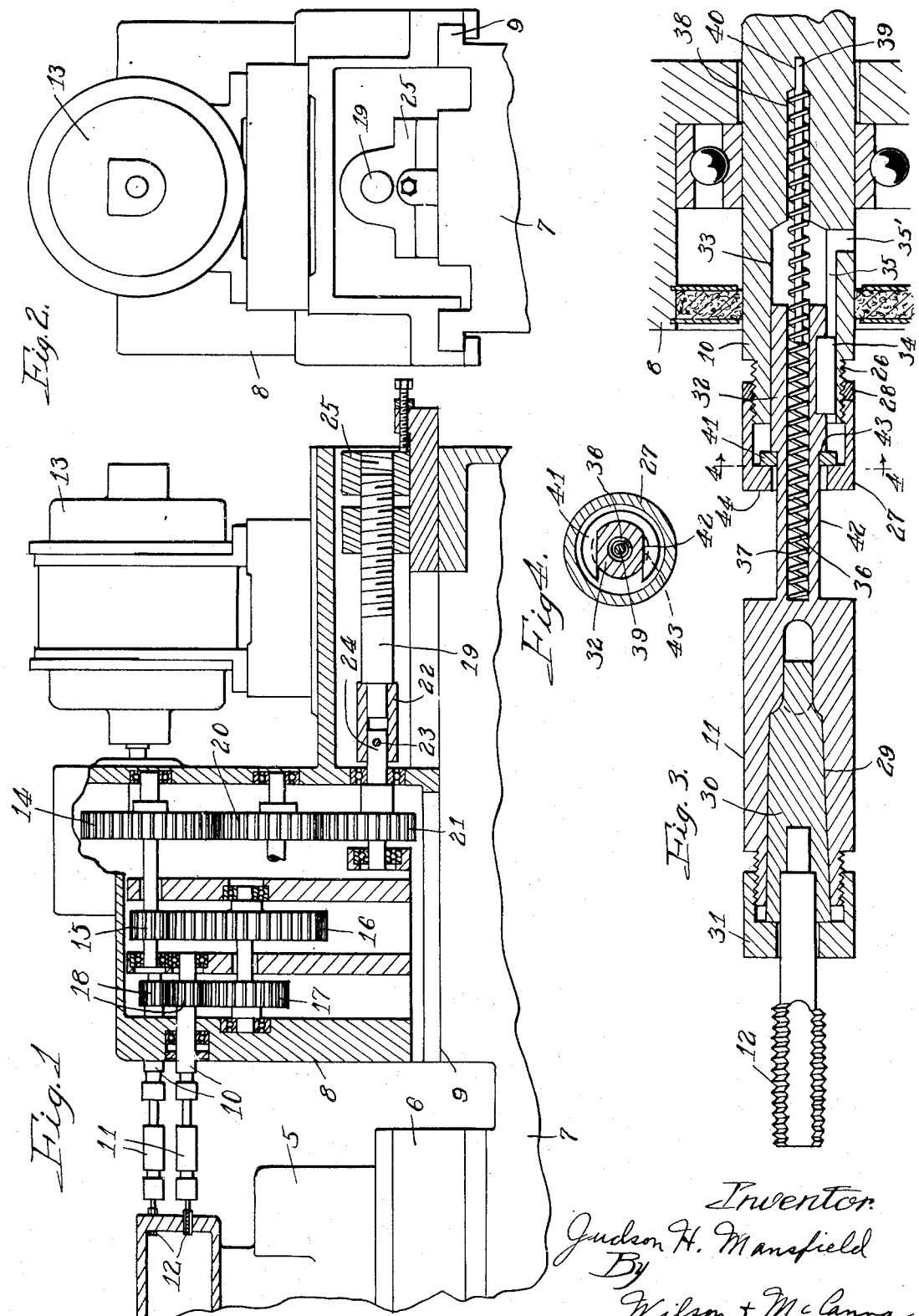
Inventor.
Judson H. Mansfield
By
Wilson + McCanna
Attys.

Patented May 31, 1932

1,861,350

UNITED STATES PATENT OFFICE

JUDSON H. MANSFIELD, OF ROCKFORD, ILLINOIS, ASSIGNOR TO GREENLEE BROS. & CO., OF ROCKFORD, ILLINOIS, A CORPORATION OF ILLINOIS

TAPPING MACHINE

Application filed July 9, 1928. Serial No. 291,155.

This invention relates to improvements in tapping machines and more particularly those equipped with a plurality of spindles for simultaneously tapping a corresponding number of holes in the work.

Multiple spindle tapping machines have heretofore usually employed full-floating taps and the spindle head or heads were fed by hand, the operator turning a hand wheel and feeding the head at as uniform a rate as possible. With this kind of operation the taps were allowed to take their own lead, that is to say, there was no regard given the fact that one tap might have a greater number of threads to cut per inch than a neighboring tap or taps. The result was that the first few threads of each hole were apt to be chewed up before the taps could take hold enough to withstand the strains incident to faulty feeding of the head. Aside from this difficulty there was bound to be more or less inaccuracy in the tapping of the holes with this kind of operation, one tap having end thrust thereon in one direction and a neighboring tap or taps having end thrust thereon in the opposite direction accordingly as the taps took different leads, and as the head happened to be fed. It is, therefore, the principal object of my invention to provide a tapping machine wherein the head or heads have a positive uniform feed and the taps are driven in a direct relationship therewith, the individual taps being driven at speeds proportionate to the number of threads to be cut thereby, thus eliminating most of the objections just enumerated.

Another important object of my invention is to provide one-way or semi-floating taps as distinguished from the two-way or full-floating taps heretofore employed whereby the taps, while given a substantially positive lead with the positive feed of the spindle head or heads, due to the operation as above described, are allowed to lag relative to the head where the head is fed faster than the lead of any one or more taps, the lead of the feed screw for the head being properly calculated so as to be greater than the lead of any one or more of the taps. This arrangement eliminates the danger of tap breakage at the time the drive of the spindles is reversed and the head or heads are backed away from the work, the amount of lag being sufficient to take care of any ordinary amount of backlash in the gears driving the spindles. The semi-floating taps, as may be gathered from the foregoing, are mounted so as to be free to yield only against spring pressure which is otherwise heavy enough for a substantially positive feed of the taps, the taps, however, being held positively against yielding or floating in the opposite direction. This construction, aside from offering the advantage of allowing the taps to lag with respect to the head as just described, is of great advantage in preventing breakage of taps in the event one or more holes do not happen to be drilled in the work, the work being left blank either because of certain necessary drills being omitted in the drilling machine operation or the drills having broken off in the work, in either of which events the taps upon encountering the blank surface of the work are arranged to back up against the action of their springs and thus avoid breakage thereof or jamming of the machine.

The invention is illustrated in the accompanying drawings, wherein—

Figure 1 is a fragmentary longitudinal vertical section of a tapping machine embodying my invention;

Fig. 2 is an end view of Fig. 1;

Fig. 3 is a central longitudinal section through one of the tap spindles showing the novel construction provided for semi-floating operation of the taps; and Fig. 4 is a cross-section taken on the line 4—4 of Fig. 3 looking in the direction of the arrows.

The same reference numerals are applied to corresponding parts throughout the views.

The present invention has reference to multiple spindle tapping machines for the simultaneous tapping of a plurality of holes in a piece of work of any kind, machines of this type being commonly used in the production of automotive and tractor parts, cream separator parts, etc. Such machines may be of the single end or double end type or, in fact, any plural-way type, depending on the kind of work to be handled. The machine, a portion of which is herein illustrated, happens to be of the double end type wherein the work 5 is arranged to be supported on a suitable fixture 6 on the bed 7 between the two spindle heads mounted on ways at opposite ends of the bed, only one head being shown at 8 on the ways 9. A plurality of tap spindles 10 are mounted in the head 8 in a predetermined arrangement according to the location of the holes to be tapped in the work, the shanks or spindle extensions 11 having taps 12 mounted in chucks or holders and arranged for one-way or semi-floating operation of the taps with respect to the spindle head. It will suffice to state at this point that the taps are arranged to be free to lag with respect to the spindle head to permit the latter to be fed faster than the taps progress in the work. The semi-floating operation of the taps, however, will not permit of the spindle head lagging with reference to the taps, such as was permitted, for example, in the case of the full-floating taps heretofore used. The use of the semi-floating taps constitutes a very important feature of my invention as will soon appear. An electric motor 13 is arranged to drive all of the tap spindles 10 through intermediate gears 14—16 and gear clusters 17—18 in a manner common to multiple spindle machines of various kinds, with this distinction, however, that in the present case I have also made provision for the driving of a feed screw 19 with the spindles 10 through intermediate gears 20—21. The feed screw 19 is driven through a drive coupling 22 having a safety shear pin 23 connecting the same with the stub shaft 24 on which the gear 21 is mounted. The feed screw threads in a nut 25 mounted on the bed 7. It will be evident from the description that the feed screw, being driven simultaneously with the tap spindles, will serve to feed the spindle head at a uniform rate toward the work to introduce the taps in the holes therein. The motor 13 is of a reversible type and is arranged at a certain point in the travel of the spindle head to have the circuit therefor reversed, as, for example, through a dog-operated master switch in turn controlling a magnetically operated switch connected with the motor, whereby to return the head and simultaneously back out the taps from the work.

Now, in accordance with my invention, I provide the gears 17—18 for the various tap spindles of different ratios according to the number of threads per inch to be cut by any given tap, that is to say, a tap cutting a greater number of threads than a neighboring tap or taps will have its spindle geared to run at a correspondingly higher speed. Thus, regardless of the extreme variations which there may be among the taps, the leads for all of the taps will be substantially alike. With this novel arrangement, namely, that of providing a uniform power feed for the spindle head and making provision for the driving of the various spindles at speeds proportionate to the number of threads per inch to be cut by any given tap, and interconnecting the drives for the feed screw and the spindles such that the spindle head will be fed faster than the taps progress in the work, most of the difficulties encountered in the use of full-floating taps, where the spindle heads were fed by hand, are avoided. In other words, the taps are given a substantially positive feed and are not expected to take their own lead; the spindle head advances at a uniform rate, always more than keeping up with the taps, as distinguished from the feeding of the head in fits and starts by hand and in no direct predetermined relationship to the leads of all of the taps. The natural result is that the threads are cut accurately and absolutely uniformly and, furthermore, the first threads in each hole prove to be just as good as the rest of the threads, never being chewed up as was heretofore the case. Now, as may be inferred from the foregoing, I have the lead of the feed screw slightly greater than that of the taps for this reason: The spindle head will gain on the taps in feeding toward the work, or, stated the other way, the taps will lag with reference to the spindle head, and when the motor 13 is reversed at the limit of the feed of the spindle head, as above described, the amount of lag will take care of the backlash in the gears 15—18 such that there will be no danger of tap breakage by reason of the spindle head commencing to return an instant before the reversal of the taps, it being evident that there is much less likelihood of backlash in the gear train 14—20—21 playing any part than in the case of the gear train or trains 14—18.

Referring now more particularly to Figs. 3 and 4 for an understanding of the construction employed for the purpose of providing a semi-floating mounting of each tap in its spindle, it will be observed that the spindle 10 projects from the head 8 and has a reduced externally threaded end 26 receiving an internally threaded adjusting sleeve 27 and lock nut 28. The shank or spindle extension 11, having a socket 29 therein for holding a chuck or tap holder 30 adapted to receive the tap 12, and having a sleeve 31 threading on the outer end thereof for holding the tap properly chucked, has a reduced substantially cylindrical inner end portion 32 slidably received in an axial bore 33 provided in the spindle 10. A key 34, slidable in the keyway 35 provided in one side of the bore 33, is arranged to transmit the drive from the spindle 10 to the shank 11 and thence to the tap 12 while permitting inward movement of the shank endwise with respect to the spindle. A hole 35' drilled into the spindle at the inner end of the keyway 35 serves as a breather port permitting unhindered plunger action of the shank 11 with respect to the spindle 10. A fairly heavy coiled compression spring 36 is received and seats at one end in an axial bore 37 provided in the portion 32 of the shank 11 and has its other end received and seating in the end of a bore 38 of similar size constituting a reduced extension of the bore 33. The spring 36 has its inner end fitting over a pin 39 having a drive fit in a hole 40 drilled into the spindle 10 at the inner end of the bore 38, the purpose of the pin being to keep the spring from buckling and thereby interfering with the backing up of the shank 11 with respect to the spindle 10 against the action of the spring which tends normally to hold the shank in extended relation to the spindle under such load that for all practical purposes the tap 12 can be regarded as being positively fed with its spindle. Outward movement of the shank 11 with respect to the spindle is limited by a horseshoe washer 41 fitting over a flattened portion 42 of the inner end portion 32 of the shank 11 and arranged to bear against the shoulders 43 defining the end of said portion, the said washer being received and held in place within the sleeve 27 and bearing against the inside of an annular shoulder 44 provided in the outer end of said sleeve. The sleeve 27 is arranged to be adjusted on the spindle to vary the load of the spring 36 as well as to effect a slight adjustment in the extension of the tap with respect to the spindle head, the sleeve 27 being arranged to be locked in adjusted position by the tightening of the nut 28.

In operation, the semi-floating mounting of the taps, in addition to permitting lagging of the taps with respect to the spindle head as above described, has been found to be of considerable advantage in preventing otherwise unavoidable tap breakages. For example, in the handling of numerous castings in quantity production, there is often apt to be one or more holes in which a drill has broken off, which also means that other pieces of work will be left blank where holes should have been drilled; in such cases, the taps upon encountering the broken off drills or the blank surface of the work will simply back up into their spindles and no breakage of the taps or jamming or other injury to the machine will result.

The foregoing description is believed to convey a clear understanding of the various objects and advantages of my invention. In view of the fact that many changes in details of construction or arrangement of parts might be made without sacrificing the more important advantages above outlined, it should be understood that the appended claims are to be construed to cover all legitimate modifications and adaptations.

I claim:

1. In a tapping machine, comprising a bed providing ways thereon, a spindle head movable on said ways, a plurality of spindles carried thereby, taps therefor, a feed screw for communicating feed to the head, a power driven shaft, means provided a driving connection between said shaft and the feed screw, and intermediate gears for driving the spindles driven from said shaft whereby the spindle drive and feed screw drive have a direct relationship to one another, spindle extensions carrying the taps and having a one-way or semi-floating mounting on the spindles permitting the same to lag with respect to the spindle head, and gears driven from the intermediate gears for driving the various spindles, the gear ratios for the separate spindles being different proportionate to the number of threads per inch to be cut by the taps driven thereby whereby to maintain the lead of all of the taps slightly less than the lead of the feed screw.

2. In a tapping machine, comprising a bed providing ways thereon, a spindle head movable on said ways, a plurality of spindles carried thereby, taps for said spindles, a feed screw for communicating feed movement to the spindle head, and a power driven shaft having a driving connection with the feed screw, spindle extensions carrying the taps having a one-way or semi-floating mounting on the spindles permitting the same to lag with respect to the spindle head, and separate gearing connections between said shaft and the spindles for communicating power feed to the head during the operation of said spindles, the gearing connections being such that the feed of the spindle head by its feed screw is greater than the lead of any one or all of the taps.

3. In a tapping machine, comprising a bed providing ways thereon, a spindle head movable on said ways, a plurality of spindles carried thereby, taps for said spindles, and a feed screw for communicating feed movement to the spindle head, spindle extensions carrying said taps having a one-way or semi-floating mounting on the spindles permitting the same to lag with respect to the spindle head, and power means for driving the feed screw and spindles so as to communicate positive feed to the head at a rate greater than the lead of any one or all of the taps.

In witness of the foregoing I affix my signature.

JUDSON H. MANSFIELD.